US011164168B2

(12) United States Patent
Hoeschen et al.

(10) Patent No.: US 11,164,168 B2
(45) Date of Patent: Nov. 2, 2021

(54) METHOD OF OPERATING AUTOMATED TELLER MACHINE IN MULTI-SHEET WITHDRAWALS

(71) Applicant: WINCOR NIXDORF INTERNATIONAL GMBH, Paderborn (DE)

(72) Inventors: Hermann Hoeschen, Paderborn (DE); Stefan Moock, Altenbeken (DE)

(73) Assignee: Wincor Nixdorf International GMBD, Paderborn (DE)

( * ) Notice: Subject to any disclaimer, the term of this patent is extended or adjusted under 35 U.S.C. 154(b) by 971 days.

(21) Appl. No.: 14/696,828

(22) Filed: Apr. 27, 2015

(65) Prior Publication Data
US 2015/0317617 A1 Nov. 5, 2015

(30) Foreign Application Priority Data
Apr. 30, 2014 (EP) .................................. 14166588

(51) Int. Cl.
*G06Q 20/10* (2012.01)
*B65H 7/20* (2006.01)
(Continued)

(52) U.S. Cl.
CPC .......... *G06Q 20/1085* (2013.01); *B65H 7/20* (2013.01); *G07D 11/237* (2019.01); *G07D 11/24* (2019.01);
(Continued)

(58) Field of Classification Search
CPC .... G06Q 20/1085; G06Q 40/00; G06Q 20/40; G07F 19/20; G07F 19/201
(Continued)

(56) References Cited

U.S. PATENT DOCUMENTS 7,252,185 B2 * 8/2007 Fujita .................... G07D 11/40
194/350
7,556,259 B2 * 7/2009 Graef ................... B65H 3/5284
271/122
(Continued)

FOREIGN PATENT DOCUMENTS

DE 10 2007 028 858 1/2009
DE 10 2008 029 995 12/2009
(Continued)

OTHER PUBLICATIONS

Jim Bowen, How ATMs Work, Aug. 1999, America's Community Banker, vol. 8, Issue 8, p. 20 (1 page) (Year: 1999).*
German Search Report dated Sep. 23, 2014.

*Primary Examiner* — Benjamin S Brindley
(74) *Attorney, Agent, or Firm* — Black, McCuskey, Souers & Arbaugh LPA

(57) ABSTRACT

A method of operating a device (10) for handling banknotes detects multi-sheet withdrawals using a multi-sheet withdrawal sensor (30). If a multi-sheet withdrawal has been detected, at least the banknotes of the multi-sheet withdrawal are supplied to an input and/or output tray (22). Next, the banknotes are further separated. The denomination and/or number of the banknotes of the multi-sheet withdrawal is determined. The determined number and/or denomination is taken into account in the framework of the inventory management of the cash cassettes (16).

8 Claims, 3 Drawing Sheets

(51) Int. Cl.
*G07F 19/00* (2006.01)
*G07D 11/24* (2019.01)
*G07D 11/34* (2019.01)
*G07D 11/237* (2019.01)
*G07D 11/26* (2019.01)

(52) U.S. Cl.
CPC ............ *G07D 11/26* (2019.01); *G07D 11/34* (2019.01); *G07F 19/203* (2013.01)

(58) Field of Classification Search
USPC .......................................................... 705/43
See application file for complete search history.

(56) References Cited

U.S. PATENT DOCUMENTS

| | | | | |
|---|---|---|---|---|
| 7,967,191 B1* | 6/2011 | Enright | .................. | G07F 19/20 235/379 |
| 8,225,989 B1* | 7/2012 | Turocy | .................. | G07F 19/20 235/379 |
| 8,561,888 B1* | 10/2013 | Graef | .................. | B65H 3/042 235/379 |
| 2001/0013541 A1* | 8/2001 | Modi | .................. | G07D 7/164 235/379 |
| 2005/0023106 A1* | 2/2005 | Abe | .................. | G07D 11/50 194/207 |
| 2005/0091159 A1* | 4/2005 | Ichikawa | ................ | G07D 11/24 705/40 |
| 2005/0173515 A1* | 8/2005 | Sawa | .................. | G07F 19/207 235/379 |
| 2006/0000889 A1* | 1/2006 | Ma | .................. | G07D 7/183 235/381 |
| 2008/0314972 A1* | 12/2008 | Crews | .................. | G07F 19/20 235/379 |
| 2010/0116619 A1* | 5/2010 | Jones | .................. | G07D 11/30 194/217 |
| 2010/0198396 A1* | 8/2010 | Brexel | .................. | G07D 11/25 700/219 |
| 2010/0213023 A1 | 8/2010 | Freitag et al. | | |
| 2010/0288831 A1* | 11/2010 | Graef | .................. | B65H 1/26 235/379 |
| 2011/0031308 A1* | 2/2011 | Holland-Letz | ......... | B65H 1/022 235/379 |
| 2011/0130870 A1* | 6/2011 | Aoji | .................. | G07D 11/40 700/218 |
| 2012/0211328 A1* | 8/2012 | Ito | .................. | G07F 19/203 194/206 |
| 2013/0140133 A1* | 6/2013 | Aoji | .................. | G07D 11/40 194/350 |
| 2013/0248320 A1* | 9/2013 | Tomizawa | ............ | G07D 11/22 194/206 |
| 2013/0341850 A1 | 12/2013 | Petermann et al. | | |
| 2016/0063792 A1* | 3/2016 | Luo | .................. | B65H 29/16 271/3.12 |

FOREIGN PATENT DOCUMENTS

| | | |
|---|---|---|
| DE | 10 2009 006 810 | 8/2010 |
| DE | 10 2011 000 794 | 8/2012 |

\* cited by examiner

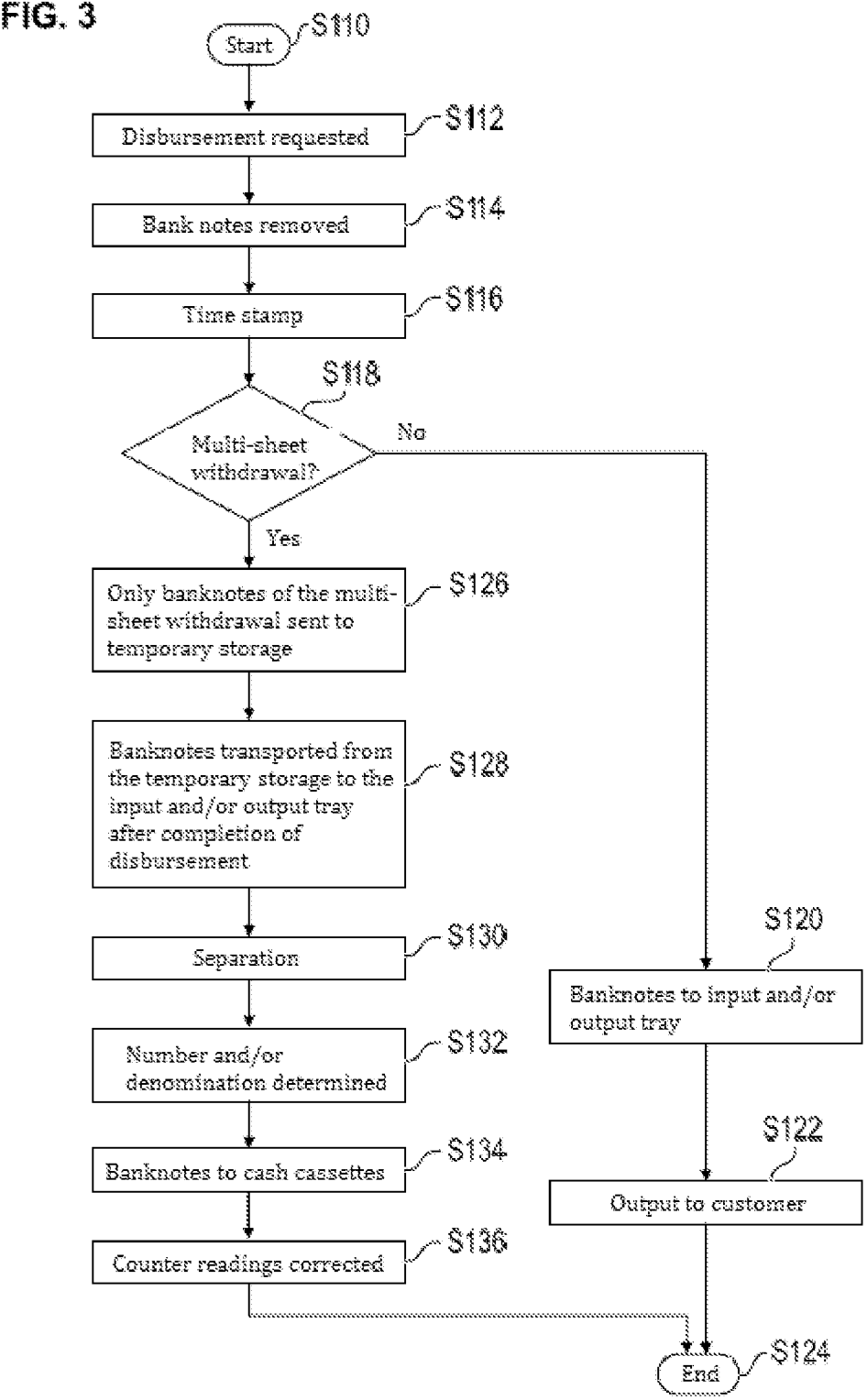

METHOD OF OPERATING AUTOMATED TELLER MACHINE IN MULTI-SHEET WITHDRAWALS

BACKGROUND

1. Field of the Invention

The invention relates to a method of operating a device for handling banknotes and in particular an automated teller machine. In the method, banknotes are taken out from cash cassettes of the device according to a request for disbursement. Multi-sheet withdrawals, which occur when the banknotes are taken out from the cash cassette, are detected by means of a multi-sheet withdrawal sensor.

2. Description of the Related Art

When banknotes are taken out of the cash cassettes for the disbursement of a requested amount of money via the automated teller machine, it may happen that so-called multi-sheet withdrawals might occur, that is, that a plurality of banknotes that overlap at least partially with one another may be withdrawn all together from a cash cassette, though only one banknote was actually supposed to be withdrawn. This can easily occur, for example, with fouled or sticky banknotes.

For this reason, known automated teller machines comprise a plurality of thickness sensors, wherein one such thickness sensor is respectively arranged downstream of the withdrawal module of each cash cassette, the thickness sensors making it possible to identify the thickness of the withdrawn banknotes. Through the thickness, it can be determined whether more than one banknote was withdrawn, which would constitute a multi-sheet withdrawal. If a multi-sheet withdrawal is correspondingly detected, then the banknotes of this multi-sheet withdrawal are not disbursed, but rather are transported to a reject cassette provided for this purpose. New banknotes are accordingly taken out of the cash cassettes in order to disburse the amount of money.

With this known method, it is problematic that after the occurrence of a multi-sheet withdrawal, the correct inventory of banknotes in the corresponding cash cassette is no longer known, because it is unknown how many banknotes are contained in the multi-sheet withdrawal. This is especially critical with the mixed storage of banknotes, because the denomination of the banknote that would be the next to be taken out from the corresponding cash cassette is no longer known. In addition, certainty regarding the inventory of banknotes in the cash cassette is absolutely critical for cash cycle management. In so-called cash cycle management, cash cassettes are interchanged directly between automated teller machines and other devices for handling banknotes, e.g., cash register systems, instead of being sent to a cash center beforehand. It is only possible to do so if the correct inventory of each cash cassette is actually known.

Patent document DE 10 2009 006 810 A1 discloses an automated teller machine with which, after the occurrence of a multi-sheet withdrawal, the banknotes of this multi-sheet withdrawal are initially transported to a temporary storage. Next, the banknotes are individually taken out from the temporary storage and supplied to a reader unit by which the denomination of the banknotes is determined. A disadvantage of this automated teller machine is that so doing necessitates providing an additional separation unit for separating the banknotes in the temporary storage. In particular, this is very costly to implement if a roll storage is used as the temporary storage, because the banknotes of the multi-sheet withdrawal would be stored in a correspondingly overlapping manner on the roll storage.

Patent document DE 10 2007 028 858 A1 describes an automated teller machine with which, if multi-sheet withdrawals occur during a deposit, these multi-sheet withdrawals are initially temporarily stored in a temporary storage. Next, separation is attempted once more.

Another automated teller machine is known from patent document DE 10 2008 029 995 A1.

The object of the invention is to provide a method of operating a device for handling banknotes by means of which a reliable form of cash cycle management can be ensured in a simple manner, even in the event of multi-sheet withdrawals.

SUMMARY OF THE INVENTION

According to the invention, if a multi-sheet withdrawal is detected during a disbursement procedure, at least the banknotes of this multi-sheet withdrawal are transported to an input and/or output tray for inputting and/or outputting banknotes. However, at least initially, these banknotes are not outputted, but rather the banknotes of the multi-sheet withdrawal are initially separated from the input and/or output tray and supplied to a reader unit. The reader unit determines the denomination of the individual banknotes and/or the number of banknotes in the multi-sheet withdrawal. The determined number and/or denomination of the banknotes of the multi-sheet withdrawal will be taken into account for inventory management of the cash cassette. In particular, if a multi-sheet withdrawal actually has occurred, the counter reading of the individual cash cassettes and in particular the counter readings of those cash cassettes from which the banknotes of the multi-sheet withdrawal were taken out is corrected accordingly.

So doing offers a simple manner of achieving the ability to again determine the corrected counter reading of the individual cash cassettes after the occurrence of a multi-sheet withdrawal, by correspondingly separating out the multi-sheet withdrawal and determining the number of the banknotes and/or the denomination, thus enabling reliable cash cycle management.

Supplying the banknotes of the multi-sheet withdrawal to the input and/or output tray makes it possible for the separation and subsequent determination of the denomination and/or number to be accomplished using units that would already be used to separate and verify the banknotes from inputted stacks of banknotes. So doing obviates the need for additional components, and achieves a particularly simple configuration of the automated teller machine.

The method according to the invention even makes it possible to correct other inaccuracies in the inventories of banknotes in the cash cassettes that are caused not by a multi-sheet withdrawal but instead by another error, such that reliable inventory management is ensured at all times. Such errors may include, for example, a banknote jam, convergence of banknotes, and/or failures in the electronics, which hinder the tracing of banknotes within the device for handling banknotes, e.g., failures of photoelectric sensors, other sensors, or the bus system.

It is particularly advantageous for just one multi-sheet withdrawal sensor for detecting multi-sheet withdrawals to be provided, wherein a multi-sheet withdrawal can be detected via this multi-sheet withdrawal sensor even irrespective of the cash cassette from which the banknotes were taken out. For this purpose, in particular, the multi-sheet withdrawal sensor is arranged at a position on the transport path that lies downstream of all the cash cassettes, so that the banknotes necessarily must be transported past this sensor irrespective of the cash cassette from which the banknotes have been taken out. This ensures that, through avoiding the unnecessary provision of an individual sensor for each cash cassette, costs and installation space can be correspondingly minimized.

In order to be able to reliably determine the cash cassette from which the banknotes of the corresponding multi-sheet withdrawal were taken out in spite of the fact that only one multi-sheet withdrawal sensor is provided, a time stamp is assigned respectively to the banknotes each time a banknote is taken out from one of the cash cassettes. Through these time stamps, if a multi-sheet withdrawal has been detected via the multi-sheet withdrawal sensor, then it can be reliably and unambiguously determined from which of the cash cassettes these banknotes were taken out. The time stamp is in particular designed in such a manner that the chronological order in which the banknotes are taken out is stored in a control unit such that a corresponding counting of the banknotes during transport past the multi-sheet withdrawal sensor makes it possible to determine with which banknotes a multi-sheet withdrawal may potentially have taken place. Alternatively, the assignment can be determined likewise via corresponding time determinations that correspond to the length of the transport route from the individual cash cassettes to the multi-sheet withdrawal sensor.

It is especially advantageous for the multi-sheet withdrawal sensor to be configured in the form of a thickness sensor, which is able to determine the thickness of the banknote or banknotes being transported past the thickness sensor. The thickness provides a reliable manner of inferring the existence of multi-sheet withdrawals.

In an especially advantageous embodiment, irrespective of whether or not a multi-sheet withdrawal has been detected, all of the banknotes of the disbursement request and therefore all of the banknotes that are selected by the control unit in order to disburse the requested amount of money are initially taken out from the cash cassettes and transported to the input and/or output tray. If no multi-sheet withdrawal has been detected by the multi-sheet withdrawal sensor, all of the banknotes of the disbursement request are outputted accordingly.

If, however, a multi-sheet withdrawal is detected, then all of the banknotes of the disbursement request and therefore both the banknotes of the multi-sheet withdrawal and the other individually withdrawn banknotes are further separated from the input and/or output tray and supplied to the reader unit so that the denomination and/or number of the individual banknotes can be determined. Subsequently, the banknotes are temporarily stored in a temporary storage.

If the number of banknotes detected via the reader unit and/or the total value of the banknotes that were taken out from the input and/or output tray coincide(s) with the intended number or the intended total value, then the banknotes are taken back out of the temporary storage and supplied once more to the input and/or output tray, via which they are then outputted to the operator of the device. This ensures that if the multi-sheet withdrawal sensor has erroneously detected a multi-sheet withdrawal, then these banknotes will not be unnecessarily deducted, but instead will still be outputted. Thus, the total disbursement process is simplified and an unnecessary return of banknotes is avoided. The "intended number" refers in particular to the number of banknotes that was determined by the control unit in order to disburse the requested amount of money. The intended total value corresponds to the requested disbursement amount.

If, however, it is determined after all of the banknotes of the disbursement procedure have been taken out that the number of banknotes or the total value of the banknotes does not coincide with the intended number or the intended total value, then the banknotes are taken back out of the temporary storage and either supplied to a reject cassette provided specifically for this purpose or alternatively supplied to the cash cassettes. Here, the banknotes are in particular distributed to the cash cassettes in accordance with the denomination thereof, and preferably supplied to those cash cassettes from which they were also previously taken out. Supplying the banknotes to the cash cassette is has an advantage over supplying same to the reject cassette in that the banknotes become again available for subsequent disbursement, allowing the interval between refillings of the automated teller machine to be extended.

If the number of banknotes and/or the total value of the banknotes does not coincide with the intended number or the intended total value, then the counter readings of the cash cassette are corrected in such a manner that the counter reading will again corresponds to the actual number of accommodated banknotes. The counter reading refers in particular to the number of the banknotes currently being accommodated in the cash cassette. Correcting the counter inventory ensures that reliable cash cycle management is possible at all times.

Here, the counter readings can be corrected both before the banknotes are returned to the cash cassettes or supplied to the reject container, and thereafter. Similarly, these two steps can also be carried out simultaneously.

In an alternative embodiment of the invention, when a multi-sheet withdrawal has been detected, then the banknotes of this multi-sheet withdrawal are first supplied to a temporary storage for temporary storage of the banknotes and thus are not supplied directly to the input and/or output tray. In contrast, the other banknotes that were taken out for the disbursement procedure are directly supplied to the input and/or output tray. In particular, a corresponding replacement banknote is taken out from the respective cash cassette or from another cash cassette of the same denomination and also supplied to the input and/or output tray in place of the banknotes of the multi-sheet withdrawal or in place of that banknote that was actually individually taken out and then taken out along with the others. Accordingly, the desired disbursement amount can next be outputted to the operator of the automated teller machine.

Once the disbursement procedure has ended, and if no other disbursement or deposit procedure has been initiated, then the banknotes of the multi-sheet withdrawal are taken out from the temporary storage and supplied to the input and/or output tray. Here, only the banknotes of the multi-sheet withdrawal or, if a plurality of multi-sheet withdrawals have taken place in one disbursement procedure, the banknotes of this plurality of multi-sheet withdrawals are supplied to the input and/or output tray. Next, only these banknotes are accordingly also separated from the input and/or output tray and supplied to the reader unit, wherein the reader unit then in turn determines the number and/or denomination of the banknotes supplied thereto.

Next, the separated banknotes are supplied either to a reject cassette and/or the cash cassettes, in particular respectively to the cash cassettes from which they were taken out. Here, the supplying thereof takes place in particular directly, meaning that the banknotes are not supplied back to the temporary storage beforehand. Alternatively, the banknotes may also initially be supplied to the temporary storage and, only once the number and/or denomination of all of the banknotes of the multi-sheet withdrawal has been determined, be then taken out from the temporary storage and supplied to the reject cassette or to the cash cassettes. Direct supply is advantageous in that the procedure can be completed more quickly.

Supplying the banknotes to the cash cassettes in turn ensures that the banknotes are again available for the next disbursement.

It is especially advantageous if, after the number and/or denomination of the banknotes of the multi-sheet withdrawal has been determined, the counter readings of the cash cassettes are corrected in such a manner that the counter reading again corresponds to the actual number of the accommodated banknotes. This in turn ensures that reliable cash cycle management is possible.

Also, in this method, the counter readings may optionally be corrected before the banknotes are supplied to the cash cassettes or reject cassette, or thereafter. Similarly and alternatively, both these steps may be carried out simultaneously.

Further features and advantages of the invention shall become more apparent from the following description, which illustrates the invention in greater detail by way of embodiments in conjunction with the accompanying drawings.

BRIEF DESCRIPTION OF THE DRAWINGS

FIG. 3 illustrates a flowchart of a method of operating a device for handling banknotes according to a second embodiment.

DETAILED DESCRIPTION

Figure 1:
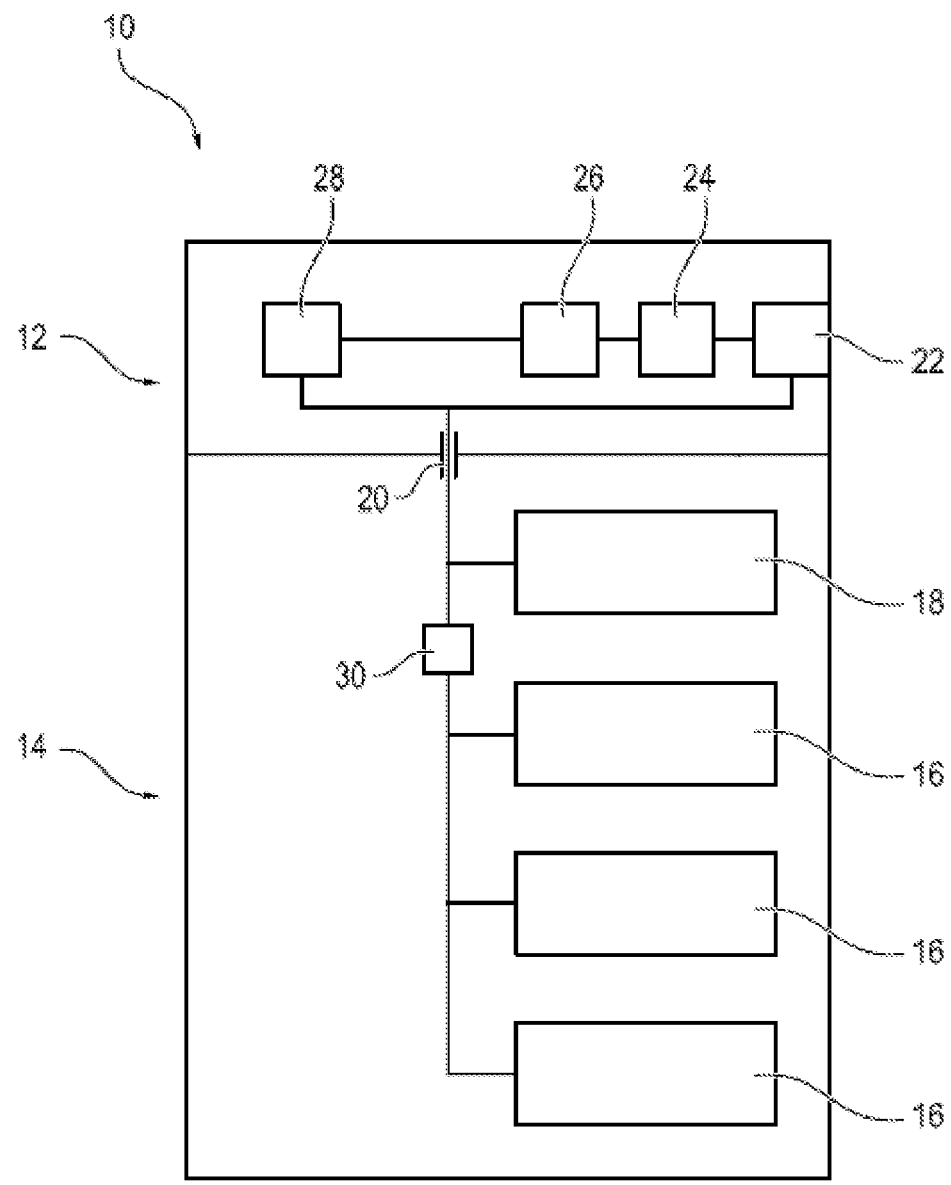
FIG. 1 illustrates a schematic representation of an automated teller machine.

FIG. 1 illustrates a schematic representation of a device for handling banknotes that is embodied as an automated teller machine 10. Alternatively, the device for handling banknotes may also pertain to an automatic cash safe or to an automatic cash register system.

The automated teller machine 10 comprises a head module 12 and a safe deposit module 14, which accommodates three cash cassettes 16 and a reject and retract cassette 18 in the embodiment illustrated in FIG. 1. The automated teller machine 10 is configured as a recycling machine, meaning that banknotes can be deposited therein and likewise can also be disbursed therefrom. Alternatively, the automated teller machine 10 may be strictly a cash disbursement machine.

The deposited banknotes are accommodated in the cash cassettes 16, as are the additional banknotes that are available for disbursement. Herein, the banknotes are accommodated in particular in the form of a stack of banknotes standing on the edges thereof, and can be separated and taken out from the cash cassettes 16 or supplied to the cash cassettes 16 via a separation and supply modules (not shown). The reject and retract cassette 18 serves to accommodate banknotes that are not taken out, suspected counterfeit notes, or other banknotes, which are not to be disbursed back out.

In the safe deposit module 14, a slot 20 is provided, through which the banknotes can be transported between the head module 12 and the safe deposit module 14. In the head module 12, which is depicted in a very simplified manner, an input and/or output unit 22 (also referenced as the "input and/or output tray" and "input and output unit tray") for inputting banknotes and/or outputting banknotes to a customer is illustrated.

If banknotes are inputted by the customer, then the inputted banknotes are separated via a separation unit 24 and next supplied to a reader unit 26, by means of which the denomination and/or authenticity of the individual banknotes can be determined. Next, these banknotes are supplied to a temporary storage 28 and stored therein until such a time as when the banknotes, which were inputted all at once as a bundle of banknotes, have been separated and the authenticity thereof has been verified. The temporary storage 28 is, in particular, a roll storage. Next, the deposited banknotes are supplied to the cash cassettes 16.

Conversely, during disbursement, after a corresponding disbursement request has been inputted by a customer, then the banknotes that are needed for the disbursement of the desired amount are taken out from the cash cassette 16. In this process, in particular, a control unit (not shown) determines, on the basis of the desired disbursement amount, how many banknotes should be taken out of which cash cassette 16.

When the banknotes are being taken from the cash cassettes 16, it may happen that instead of each banknote being withdrawn individually, there may inadvertently be multi-sheet withdrawals. A multi-sheet withdrawal refers in particular to when two or more at least partially overlapping banknotes are withdrawn.

In such double withdrawals, there is a problem in that if the banknotes are outputted to the customer, then the customer receives more money than had been requested and than would be debited from his account. To avoid this, a thickness sensor 30 is provided, which determines the thickness of the banknotes that are taken out from the cash cassettes 16 and transported past the thickness sensor 30. The thickness provides a simple manner of determining whether a multi-sheet withdrawal is taking place.

In known automated teller machines 10, the multi-sheet withdrawals would then be supplied to the reject and retract cassette 18. This is problematic, however, in that it is then not known how many banknotes are contained in the individual multi-sheet withdrawals, such that the inventory of the cash cassettes 16 is likewise no longer known. This is especially critical for a cash cycle management in which cash cassettes are interchanged between automated teller machines 10, without first being supplied to a cash center.

Figure 2:
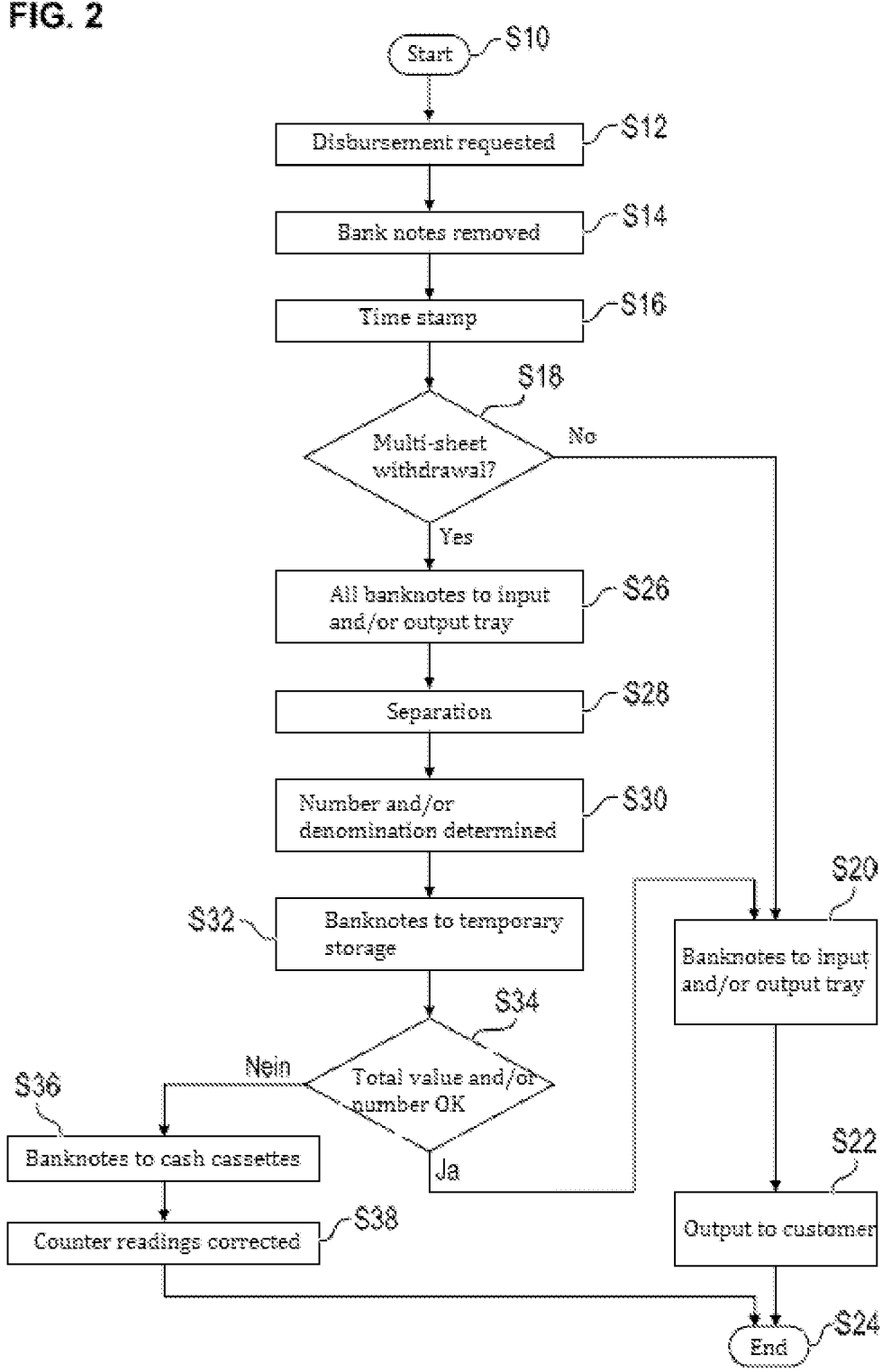
FIG. 2 illustrates a flowchart of a method of operating a device for handling banknotes according to a first embodiment.

FIGS. 2 and 3 each illustrate flowcharts of a method of operating a device for handling banknotes, with which the inventory of the cash cassettes 16 can be accurately determined at any time, even in the event of multi-sheet withdrawals, such that inventor can be managed reliably.

The method according to a first embodiment, illustrated in FIG. 2, is started in step S10. Next, in step S12 a disbursement request is made, with which a customer requests the payment of a desired amount of money. A control unit determines which banknotes must be removed from which cash cassettes 16 in order to disburse the desired amount of this disbursement request. In step S14, the individual banknotes are then incrementally taken out from the cash cassettes 16. Here, in step S16, each banknote is assigned a so-called time stamp, through which it is possible to assign the individual removed banknotes to the cash cassettes 16.

This time stamp can in particular take the form of saving the chronological order of the banknotes that were taken out from the individual cash cassettes.

It is advantageous to provide such a time stamp because then only a single thickness sensor 30 needs to be provided for detecting multi-sheet withdrawals of banknotes being taken out from all of the cash cassettes 16. The time stamp also makes it possible to determine, at any time, the cash cassette 16 from which the corresponding banknote was removed or the corresponding bank notes were removed for a multi-sheet withdrawal. Thus, there is no need to provide an individual thickness sensor for each cash cassette 16, and this results in space and cost savings.

In step S18, the thickness sensor 30 determines whether a multi-sheet withdrawal has taken place in the removal of the banknotes from the cash cassettes 16. If no multi-sheet withdrawal has taken place for any of the banknotes of the disbursement request, then all of the banknotes are supplied in step S20 to the input and/or output tray, and outputted in step S22 to a customer, before the method is terminated in step S24.

If, however, it is determined in step 818 that at least one multi-sheet withdrawal has taken place, then all of the banknotes of the disbursement request are in step 826 transported to the input and/or output tray. In particular, not only those banknotes with which a multi-sheet withdrawal has not taken place ("single-sheet withdrawals") are transported, but so too are the banknotes of the multi-sheet withdrawal transported into the input and/or output tray 22.

After all of the banknotes of the disbursement request have been placed in the input and/or output tray 22, then in step S28 the banknotes that are arranged in the input and/or output tray are separated, analogously to when banknotes are deposited. In step S30, the reader unit 26 determines the number and/or denomination of the banknotes, which are removed from the input and/or output tray 22. Here, the banknotes are initially in step S32 supplied respectively to the temporary storage 28, until all the banknotes present in the input and/or output tray have been separated and supplied to the reader unit 26.

In step S34, it is determined whether the total value of the banknotes that were removed from the input and/or output tray and supplied to the temporary storage 28 or the number of banknotes is correct. In particular, it is determined here whether the total value coincides with the desired disbursement amount and/or whether the number coincides with the predetermined number of banknotes that should actually be disbursed.

If the total value and/or number coincides with the target values, then in step S20 all of the banknotes are transported from the temporary storage 28 back into the input and/or output tray 22, so that the banknotes can be outputted in step S22 to the customer before the method is terminated in step S24.

If, however, it is determined in step S24 that the total value or the number is not acceptable, then the banknotes are transported back into the cash cassettes 16 in step S36. Here, the banknotes are in particular respectively transported back to those cash cassettes from which they were removed, and/or are transported into those cash cassettes 16 that house a corresponding denomination.

Alternatively, the banknotes may in step S36 also be supplied to the reject and retract cassette 18, but this is disadvantageous in that they are not available again for another disbursement.

Next, in step S38, the counter readings for the cash cassettes 16 are corrected, meaning that the counters are corrected in such a manner that they again coincide with the actual inventory of banknotes in the cash cassettes. This ensures that the current counter reading is known at all times and thus that the inventory can be managed reliably. Thereafter, the method is terminated in step S24.

The chronological order of steps S36 and S38 may be reversed, or steps S36 and S38 may be executed simultaneously.

FIG. 3 is a flow diagram illustrating a method of operating a device for handling banknotes according to a second embodiment. After the method has been started in step S110, then the disbursement request, the removal of the banknotes, and the assignment of the corresponding time stamp again take place in steps S112 to S116.

Next, in step S118 the thickness sensor 30 again determines whether a multi-sheet withdrawal has taken place. If no multi-sheet withdrawal has taken place for any of the banknotes of the disbursement request, then the banknotes are in step S120 transported to the input and/or output tray 22 and outputted to the customer in step S122 before the method is terminated in step S124.

If, however, it is determined in step S118 that at least one multi-sheet withdrawal has taken place, then in step S126 only the banknotes of this multi-sheet withdrawal are transported to the temporary storage 28. The other banknotes, i.e., those banknotes with which a multi-sheet withdrawal did not take place, are in turn transported to the input and/or output tray 22 as before. For those banknotes with which a multi-sheet withdrawal has taken place, "replacement banknotes" are taken out from the respective cash cassettes 16, and, provided that no multi-sheet withdrawal has taken place here, are transported to the input and/or output tray 22. The desired total amount in the desired denominations can thereby be outputted to the customer.

After the disbursement procedure is complete, i.e., after the customer has taken the desired banknotes out from the input and/or output tray 22, and if no other disbursement and/or deposit procedure has been started, then the banknotes of the multi-sheet withdrawal that were temporarily stored in the temporary storage are in step S128 transported to the input and/or output tray 22. If a plurality of multi-sheet withdrawals have taken place during one disbursement procedure, then the banknotes are supplied either simultaneously or sequentially to the input and/or output tray.

In step S130, the banknotes of the multi-sheet withdrawal that have been arranged in the input and/or output tray 22 are separated and supplied to the reader unit 26, which in step S132 determines the number and denomination of the corresponding banknotes.

Next, the banknotes are in step S134 transported back to the cash cassettes 16, with the banknotes preferably being supplied respectively to the cash cassettes 16 from which they were originally taken. Alternatively, the banknotes may be transported to other cash cassettes 16 with the corresponding denomination. It is also alternatively possible that the banknotes would not be supplied to the cash cassettes 16 but rather to the reject and retract cassette 18.

Next, in step S136, the counter readings of the cash cassettes 16 are corrected in such a manner that the counter readings again correspond to the actual inventory of banknotes in the respective cash cassette 16. This achieves reliable inventory management. The chronological order of steps S134 and S136 may also be reversed, or steps S134 and S136 may be executed simultaneously.

In step S124, the method is then terminated.

Both methods are advantageous in making it possible to respectively determine the current inventory of banknotes in the cash cassettes 16 easily and quickly. Supplying the multi-sheet withdrawals to the input and/or output tray 22 and separating therefrom obviates the need to provide a separate separation unit or separate reader unit for separating the banknotes from the temporary storage 28 and reading the separated banknotes. An especially compact and simple configuration is thereby achieved.

The method according to the first embodiment, described in connection with FIG. 2, has a further advantage over the method of the second embodiment according to claim 3 in that, provided that the disbursed amount is correct in spite of the positive detection of a multi-sheet withdrawal by the multi-sheet withdrawal sensor, referred to herein in the exemplary form of the thickness sensor 30, these banknotes are outputted to the customer and thus the transport of banknotes and resulting operations in the automated teller machine 10 are minimized.

LIST OF REFERENCE SIGNS

10 Automated teller machine
12 Head module
14 Safe deposit module
16 Cash cassette
18 Reject and retract cassette
20 Slot
22 Input and/or output tray
24 Separation unit
26 Reader unit
28 Temporary storage
30 Thickness sensor
S10 to S136 Method step

What is claimed is:

1. A method of operating an automated teller machine (ATM) comprising:
   receiving a deposit of a first plurality of banknotes in an input and output tray of the ATM from a customer;
   separating the first plurality of banknotes deposited in the input and output tray during said receiving with a separating unit of the ATM;
   taking a second plurality banknotes out from one or more cash cassettes of the ATM in accordance with a disbursement request from an operator of the ATM;
   detecting, with at least one multi-sheet withdrawal sensor of the ATM, a multi-sheet withdrawal among at least some of the second plurality of banknotes taken from the one or more cassettes of the ATM during said taking from the one or more cash cassettes;
   transporting at least the multi-sheet withdrawal of the second plurality of banknotes, taken from the one or more cassettes of the ATM during said taking, to the input and output tray when the multi-sheet withdrawal has been detected during said detecting; and
   separating, with the separating unit, the banknotes of the multi-sheet withdrawal after the multi-sheet withdrawal was transported to the input and output tray during said transporting.

2. The method of claim 1, wherein only one multi-sheet withdrawal sensor for determining multi-sheet withdrawals is used for the banknotes taken out from all of the cash cassettes.

3. The method of claim 1 wherein said taking is further defined as taking the second plurality banknotes out from a plurality of cash cassettes of the ATM in accordance with a disbursement request from an operator of the ATM; and
   wherein said method further comprises:
   assigning a time stamp to each one of the banknotes that is taken out from one of the plurality of cash cassettes during said taking, said assigning executed prior to said detecting.

4. The method of claim 1 wherein:
   said transporting further comprises transporting all of the second plurality of banknotes taken in response to the disbursement request during said taking to the input and output tray when the multi-sheet withdrawal has been detected including the multi-sheet withdrawal and single-sheet withdrawals of the second plurality of banknotes; and
   said separating further comprises separating all of the second plurality of banknotes, including the multi-sheet withdrawal and single-sheet withdrawals of the second plurality of banknotes transported during said transporting, out from the input and output tray.

5. The method of claim 1 further comprising:
   determining, with a reader unit and after said separating, the denomination of each of the separated banknotes of the multi-sheet withdrawal and the number of the separated banknotes of the multi-sheet withdrawal.

6. The method of claim 5 further comprising:
   directing the separated banknotes of the multi-sheet withdrawal back to the input and output tray in response to said determining and in response to the disbursement request from the operator.

7. The method of claim 6 further comprising:
   bypassing the one or more cash cassettes of the ATM and a reject cassette of the ATM during said directing of the separated banknotes of the multi-sheet withdrawal to the input and output tray.

8. The method of claim 6 further comprising:
   storing the separated banknotes of the multi-sheet withdrawal in a temporary storage of the ATM after said determining and before said directing back to the input and output tray of the ATM, wherein the temporary storage of the ATM is distinct from the one or more cash cassettes of the ATM and a reject cassette of the ATM.

* * * * *